US010951697B2

(12) United States Patent
Brock et al.

(10) Patent No.: US 10,951,697 B2
(45) Date of Patent: Mar. 16, 2021

(54) HOLOCHAIN—A FRAMEWORK FOR DISTRIBUTED APPLICATIONS

(71) Applicant: Holo Limited, Gibraltar (GI)

(72) Inventors: Arthur C Brock, Denver, CO (US); David Braden, Broomfield, CO (US); Jamison M. Day, Denver, CO (US)

(73) Assignee: Holo Limited, Gibraltar (GI)

( * ) Notice: Subject to any disclaimer, the term of this patent is extended or adjusted under 35 U.S.C. 154(b) by 0 days.

(21) Appl. No.: 16/895,834

(22) Filed: Jun. 8, 2020

(65) Prior Publication Data

US 2020/0389521 A1    Dec. 10, 2020

Related U.S. Application Data

(60) Provisional application No. 62/858,910, filed on Jun. 7, 2019.

(51) Int. Cl.
*H04L 29/08* (2006.01)
*H04L 9/32* (2006.01)

(52) U.S. Cl.
CPC ........ *H04L 67/1065* (2013.01); *H04L 9/3236* (2013.01); *H04L 67/108* (2013.01); *H04L 67/1076* (2013.01)

(58) Field of Classification Search
CPC .............. H04L 9/3236; H04L 2209/38; H05B 31/0087; G11B 20/00898; G06F 16/137; G06F 16/152; G06F 16/325; G06F 16/9014; G06F 16/2255
See application file for complete search history.

(56) References Cited

U.S. PATENT DOCUMENTS

| | | | | |
|---|---|---|---|---|
| 5,721,926 A | * | 2/1998 | Tamura | G06F 8/10 717/104 |
| 8,572,290 B1 | * | 10/2013 | Mukhopadhyay | G06N 20/00 709/251 |
| 2003/0044017 A1 | * | 3/2003 | Briscoe | H04L 63/06 380/277 |
| 2010/0125670 A1 | * | 5/2010 | Dondeti | H04L 67/1065 709/229 |
| 2012/0036163 A1 | * | 2/2012 | Myers | G06F 16/2228 707/797 |
| 2016/0028630 A1 | * | 1/2016 | Wells | H04L 45/7453 370/389 |
| 2020/0210451 A1 | * | 7/2020 | Wang | G06Q 20/02 |
| 2020/0233760 A1 | * | 7/2020 | Wu | G06F 11/2094 |
| 2020/0329373 A1 | * | 10/2020 | Villamar | H04W 84/18 |
| 2020/0344240 A1 | * | 10/2020 | Robison | H04L 63/102 |

* cited by examiner

*Primary Examiner* — Aftab N. Khan
(74) *Attorney, Agent, or Firm* — Taylor English Duma LLP

(57) ABSTRACT

This disclosure describes a system including nodes communicating according to a relaxed, agent-centric distributed hash table. The system includes a requesting node requesting a value from a target node. The requesting node is associated with a store radius and a query radius based on an agent location of the requesting node. The store radius indicates one or more peer nodes wherein the requesting node has knowledge about the storage content of these peer nodes. The query radius indicates one or more peer nodes wherein the requesting node has connection with these peer nodes.

20 Claims, 9 Drawing Sheets

HOLOCHAIN—A FRAMEWORK FOR DISTRIBUTED APPLICATIONS

CROSS-REFERENCES TO RELATED APPLICATIONS

This application claims the benefit of and is entitled to the priority date of provisional application 62/858,910, entitled HOLOCHAIN—A FRAMEWORK FOR DISTRIBUTED APPLICATIONS, filed Jun. 7, 2019, and is hereby incorporated in its entirety by reference.

TECHNICAL FIELD

The present disclosure relates generally to distributed computing, and more particularly to a system for finding and returning connections or content from one or more nodes in a sparsely-connected multi-node computing system where no single node has a comprehensive index of nodes or content managed by those nodes.

BACKGROUND

While it is possible to design computing systems that don't use state, many problems—particularly those that are designed to reflect human interactions and the physical world—are easier to model when the computing system has state.

Traditional software applications manage state by storing all the memory in a single place, like a filesystem or database. Just like our house or our bank account, these systems only allow a single program to change what is stored in the memory. This "single system" state management is intuitive and still the most broadly used system for managing computer system state. Even when programs were developed using multiple threads, single systems usually either delegate state management to a single thread, or they use a method of handing off control between different threads so that only one thread is "in control" of the state at any given time.

The problem with state is that it represents a hidden input to each of the functions that rely on it—and it may be changed outside of our control. For example, we may think that we have a certain amount of money in our bank account. But if someone has stolen our passwords and taken money out of our account, our record of how much money we have in our account doesn't agree with the bank account's record.

When we think about "real world" state, we have certain things that we try to control very carefully, like the amount of money in our bank account or the location of our things in our house. We have security systems that allow us to make sure that the state of these protected assets doesn't change without us knowing. In the case of our house, we have locks that make sure that we are the only ones allowed inside to move around our things. For things like our bank account, we make sure that any transactions that change the balance are approved by us.

Designing Computing Systems with State

While it is possible to design computing systems that don't use state, many problems—particularly those that are designed to reflect human interactions and the physical world—are easier to model when the computing system has state.

Traditional software applications manage state by storing all the memory in a single place, like a filesystem or database. Just like our house or our bank account, these systems only allow a single program to change what is stored in the memory. This "single system" state management is intuitive and still the most broadly used system for managing computer system state. Even when programs were developed using multiple threads, single systems usually either delegate state management to a single thread, or they use a method of handing off control between different threads so that only one thread is "in control" of the state at any given time.

Distributed Computing

The need to manage state is acute with distributed computing systems. A distributed computing system is a group of computing systems—frequently called nodes—which work together to maintain a unified or consistent view of the state represented in the system as a whole.

Single system state management is not easily compatible with distributed computing. As soon as multiple programs need to interact with the stored state, all the different programs need to be coordinated. In computing terms, the different programs wanting to interact with the system state are either "readers" (programs retrieving some stored value from the memory) or "writers" (programs adding to the memory or changing a stored value in the memory).

Distributed systems are a generalization of the multi-reader and multi-writer threaded programs that work on a single computing system. Logically, there is no reason why readers or writers cannot be on separate physical nodes, communicating via messages. The various nodes cooperate to maintain the shared system state.

Distributed systems usually have more resources available to them than single systems. This can result in higher performance or higher availability for distributed systems. But there is a tradeoff: distributed systems are subject to communication-based failures that can compromise the system. The CAP theorem states that it is impossible for a distributed data store to simultaneously provide more than two out of the following three guarantees:

Consistency: Every read receives the most recent write or an error.

Availability: Every request receives a (non-error) response—without the guarantee that it contains the most recent write.

Partition tolerance: The system continues to operate despite an arbitrary number of messages being dropped (or delayed) by the network between nodes.

The job of a state coordination function is to manage the tradeoffs within a distributed computing system. These state coordination functions are used to achieve the best possible consistency, availability, and partition tolerance possible, while mitigating or reducing the number of failures.

The job of a state coordination function is to manage the tradeoffs within a distributed computing system. These state coordination functions are used to achieve the best possible consistency, availability, and partition tolerance possible, while mitigating or reducing the number of failures.

Representing State

Before discussing various state coordination functions, it is helpful to think about how state is stored. Within a computing system, any sort of storage organization system can be used to maintain state, including ordered/unordered flat files, ISAM, heap files, hash buckets, B+ trees, logs, and log-structured merge trees. A state storage engine may also have many layers, each operating under different principles. Careful attention to how the state is stored and manipulated, however, makes it easier to make guarantees about the correctness of the data.

Different types of state storage may be mutable or immutable. A mutable storage can have its records modified. An immutable storage can only add information to the storage; previously written information cannot be changed.

Many common mutable data storage engines use a relational structure. A relational database organizes data into one or more tables (or "relations") of columns and rows, with a unique key identifying each row. The data can be "normalized" to ensure that each piece of information is stored in exactly one place. In a normalized relational database, all changes to the stored state can be expressed in terms of an ordered set of create, read, update, and delete statements, each acting on a specified domain and range within each relation. An ordered set of these state-modifying statements, applied together, is referred to as a transaction. If the transaction applies completely, or not at all, then the transaction is atomic.

Relational databases are flexible, supporting ad-hoc querying and updates to the stored data. But the strict data typing and referential controls necessary to support such flexibility also make relational databases hard to effectively scale up to respond to many readers and writers. If there is only one place where a particular piece of data is stored, then access to a particular piece of information may be a bottleneck, reducing availability.

Some databases address this issue by denormalizing (storing the data in more than one place) or using alternative, non-relational data structures. These databases, sometimes called "NoSQL databases," relax the data type, data organization, or referential controls commonly found in relational databases in order to achieve better availability, partition tolerance, or performance, at the cost of reduced consistency. These NoSQL data storage engines are also examples of mutable data stores.

Alternatively, a data storage engine can have immutable storage. For example, one type of immutable storage engine uses a log-structured storage engine. A log is an append-only, ordered sequence of records ordered by time. Changes to the system state are recorded as atomic changes in the log. At any time, the system state is defined by the ordered set of changes recorded in the log. If two nodes have the same contents in their state logs, then their states are consistent.

One alternative to totally-ordered log-based state storage is the use of additive data structures such as conflict-free replicated data types (CRDTs). CRDTs are data types that can be applied in any order by different nodes, and the end result will be consistent. This means that CRDT-based state storage has high availability and high partition tolerance, but low immediate consistency. CRDTs provide strong eventual consistency, so long as the disparities between different data stores can be tolerated during the period when replicas may be inconsistent. All nodes that have "merged" all the data structure changes, regardless of the order in which the changes are presented, are guaranteed to be in a consistent state.

Hash Chains

One important type of immutable storage is a hash chain or hash tree (sometimes called "blockchains" or "Merkle trees," respectively). Hash chains are data structures in which each record contains both information to be stored, one or more update rules, and a secure cryptographic hash of the immediately preceding record. Because each record includes the preceding hash, recursively to the start of the data structure, anyone receiving a copy of the data structure can independently verify the integrity of the entire record by applying the update rules to the stored data and calculating the appropriate hashes. This makes a hash chain or hash tree effectively immutable, even if it stored in a mutable storage, because any changes to the data invalidate the cryptographic hashes embedded in the chain.

State Coordination Functions

State coordination functions can generally be categorized as one of two types—either centralized or decentralized. Decentralized state management can further be divided into distributed state storage and distributed state management.

Distributed Systems, Centralized State

Systems with centralized state management have a designated center point by which and through which decisions for the entire system are made. To allow multiple independent programs to change the contents of the memory, there are protocols that ensure that each writer is authorized to make its changes and that the changes are made in a careful way that prevents conflicts and makes sure that all the readers see a consistent picture. Common state update protocols include two phase commit and three phase commit, both of which are frequently used in databases.

But these protocols are used to coordinate multiple programs interacting with the stored state—but the state is still primarily maintained in one place. The nodes might be distributed, but the state is centralized. In terms of the CAP theorem, distributed systems with centralized state management have high consistency and high partition tolerance, but lower availability. The central management node can be a bottleneck due to all state management needing to go through that single node, and it is difficult for distributed system to deal with the loss of the node which implements the state management function.

Distributing State Storage

One response to the problem of centralized state is to distribute the state across more than one node. In a distributed state storage system, the state—the memory—is either sharded, replicated, or both.

Sharding

In a sharded system, parts of the system state are stored on and managed by different nodes in the system. If a process needs to either read or store a value in the shared state, it first identifies a sharding key allows it to identify which node is storing and managing that particular part of the system state. The process then interacts with the node managing that part of the system state to read or write the value accordingly.

The advantage of a sharded system is that no single node is responsible for updating or storing all of the state associated with the system. This means that the load associated with state management can be spread out across the distributed system. Further, if a single node goes down, then only the fraction of the state managed by that node becomes unavailable. In terms of the CAP theorem, a sharded system is equivalent to a system with centralized state, but the chance that availability will be compromised by the loss of a node is 1/n, where n is the number of different nodes participating in the sharded state storage.

Replication

In a replicated system, some or all of the system state is duplicated across one or more nodes. The state may be completely duplicated, such for a database with a standby node, or it may be partially replicated. Updates made on one copy are communicated to the various replicas. These updates are usually distributed using one or more of transactional replication, state machine replication, or virtual synchrony.

Transactional replication refers to a model where each update is equivalent to the serialized stream of changes applied during that update. For example, a transaction log can be used to implement transactional replication between two nodes.

State machine replication is a process by which the changes and the state of the system are jointly represented as a closed set of changes that can be applied to each node. Hash chains and CRDTs can be used to implement state machine replication.

Virtual synchrony involves a group of processes which collectively work in tandem to create a replicated state. Not every node needs to participate; smaller groups of nodes are organized into process groups. Nodes join a group and are provided with a checkpoint containing the current state of the data replicated by group members. Nodes then send multicasts to the group and see incoming multicasts in the identical order. Membership changes are handled as a special multicast that delivers a new "membership view" to the nodes in the group.

Coordinating State Updates

Depending on the state management function, updates to the shared state may be performed on only one of the copies, the "master," or on any copy. If updates can only be made to the master copy, then the system has centralized state with recovery to another node. If more than one node can receive updates to the common system state, then some type of distributed state management is required.

Some of the state replication methods identified above can also be used to implement a distributed state management function. In particular, state machine replication assumes that the replicated process is a deterministic finite automaton and that atomic broadcast of every event is possible.

Consensus Algorithms

A distributed state management algorithm is also known as a consensus algorithm. A consensus algorithm is one that allows different nodes to agree on a particular value in the shared state. Examples of applications of consensus include whether to commit a transaction to a database, agreeing on the identity of a leader, state machine replication, and whether to add a particular record to a hash chain. Examples of well-known consensus algorithms include Paxos and Raft.

Consensus algorithms are designed to be resilient in the presence of network failures and changed messages. In general, consensus algorithms have the following properties:

Termination: Eventually, every correct process decides some value.

Integrity: If all (or some specified number of) correctly-operating participants propose the same value v, then the outcome of the process must equal v.

Agreement: Every correct process must agree on the same value.

To achieve this result, most consensus algorithms take one of two approaches. In the first approach, there is a deterministic process for electing one of the participating nodes to be a "leader." The leader determines the correct state value and communicates it to the other nodes. A leader-based approach also includes rules for handling failure of the leader node and network splits that result in inconsistent leader elections.

A second approach for consensus algorithms uses concurrent computation and comparison. In a concurrent computation and comparison approach, each participating node is able to compute and propose a new state value. If some number of participating nodes agree—usually a majority—then the new state value is accepted as the correct value.

Byzantine Fault Tolerance

Some consensus protocols are also designed to deal with some number of faulty or malicious nodes participating in the network. Protocols that are designed to be robust against faulty or malicious nodes are said to have "Byzantine Fault Tolerance," named for the paper that introduced the concept. Byzantine Fault Tolerant (BFT) systems either include a number of message rounds between node participants, verifying state information, or they are built upon unforgeable message signatures, such as digital signatures.

Content and Node Addressing

One problem not discussed above is the problem of addressing: when state values are being replicated, or consensus messages are being exchanged, each node needs to know how to reach other nodes participating in the distributed system.

The simplest way to handle addressing is for all nodes to have a list of other participating nodes, or to have a known "name node" that keeps track of the address information for all participating nodes. This is a solution for systems where the number of nodes is known, and where nodes like the name node can be trusted. But if nodes cannot necessarily be trusted, or if nodes are transient, a different solution can be used: a distributed hash table, or DHT.

A hash table is a data structure that associates keys to values. Values are stored in the data structure according to a hash function that computes an index into a possible array of storage buckets, which themselves provide the value. A distributed hash table performs the same function across more than one node. Any participating node can efficiently retrieve the value associated with a given key. Responsibility for maintaining the mapping from keys to values is distributed among the nodes, in such a way that a change in the set of participants causes a minimal amount of disruption. This allows a DHT to scale to extremely large numbers of nodes and to handle continual node arrivals, departures, and failures. The particular hash function used is chosen minimize changes in lookup values when the number of participants changes. The four most popular approaches are rendezvous hashing, consistent hashing, the content addressable network algorithm, and Kademlia distance. It is not always necessary that all possible values be stored in the DHT; in some cases it may be enough to have a shared formula by which a value can be calculated from a particular key.

For example, a Kademlia DHT works by specifying the structure of the network and the exchange of information through node lookups. Kademlia nodes communicate among themselves using User Datagram Protocol (UDP). A virtual or overlay network is formed by the participant nodes. Each node is identified by a number or node ID. The node ID serves not only as identification, but the Kademlia algorithm uses the node ID to locate values. When searching for some value, the algorithm takes the associated key and explores the network in several steps. Each step will find nodes that are closer to the key until the contacted node returns the value or no more closer nodes are found. When the closest nodes are found, they are returned to the requester.

Existing Systems

The most well-known hash chain application is "Bitcoin," a hash chain-based cryptocurrency ledger. In the context of the systems above, Bitcoin is a distributed system with an immutable replicated state built on a hash chain. Bitcoin uses a Byzantine Fault Tolerant consensus algorithm to coordinate transactions.

Specifically, the bitcoin blockchain is a public ledger that records bitcoin transactions between members of the network. It is implemented as a chain of blocks, each block containing a hash of the previous block up to the genesis block of the chain. Network nodes can validate transactions, add them to their copy of the ledger, and then broadcast these ledger additions to other nodes. To achieve independent verification of the chain of ownership each network node stores its own copy of the blockchain.

A network of communicating nodes running bitcoin software maintains the blockchain by "mining," that is, running a lottery-like process of determining a random hash value that meets a set of acceptance rules. About every 10 minutes, when an acceptable hash value is found, a new group of accepted transactions, called a block, is created, added to the blockchain, and quickly published to all nodes.

Sometimes separate blocks are produced concurrently, creating a temporary fork. In addition to the immutable history, participants in the blockchain have an algorithm for scoring different versions of the history so that the history with the highest value can be selected over others. Peers supporting the database have different versions of the history from time to time. They keep only the highest-scoring version of the database known to them. Whenever a peer receives a higher-scoring version (usually the old version with a single new block added) they extend or overwrite their own database and retransmit the improvement to their peers. There is never an absolute guarantee that any particular entry will remain in the best version of the history, but the shared concurrent computation rules award a higher value to adding new blocks than replacing old blocks. Therefore, the probability of an entry becoming superseded decreases exponentially as more blocks are built on top of it, eventually becoming very low.

Another type of distributed and decentralized system is used to manage source code control and updates. Two similar systems are called Git and Mercurial. Git and Mercurial are a distributed version-control system used to track changes in source code for use in software development. The files and changes to the files are organized as a Merkle tree, guaranteeing that the complete state of the version controlled files is consistent. In addition, each change has a unique cryptographic address, allowing individual commits to be selectively addressed.

Git and Mercurial each include a mutable index (also called stage or cache) that caches information about the working directory and the next revision to be committed; and an immutable, append-only object database. The object database represents the accepted state of the system. The object database contains four types of objects:

- A blob object (binary large object) is the content of a file. Blobs have no proper file name, time stamps, or other metadata. (A blob's name internally is a hash of its content.)
- A tree object is the equivalent of a directory. It contains a list of file names, each with some type bits and a reference to a blob or tree object that is that file, symbolic link, or directory's contents. These objects are a snapshot of the source tree.
- A commit object links tree objects together into a history. It contains the name of a tree object (of the top-level source directory), a time stamp, a log message, and the names of zero or more parent commit objects
- A tag object is a container that contains a reference to another object and can hold added metadata related to another object.

When a developer commits a new revision, the temporary information is added to the accepted state. Git and Mercurial provide each developer a local copy of the entire state, and provides a mechanism for exchanging commits (state changes) between different repositories. There is no universal addressing, but different repository signatures are maintained as they are merged. Thus the entire distributed source control mechanism can be seen as a distributed state consensus mechanism with periodic reconciliation between participating nodes.

Freenet is another decentralized and distributed system used for censorship-resistant communication. It uses a decentralized distributed data store to keep and deliver information. Technically, it functions as content-addressed system paired with a distributed hash table. Typically, a host computer on the network runs the software that acts as a node, and it connects to other hosts running that same software to form a large distributed, variable-size network of peer nodes. Some nodes are end user nodes, from which documents are requested and presented to human users. Other nodes serve only to route data. All nodes communicate with each other identically—there are no dedicated "clients" or "servers". It is not possible for a node to rate another node except by its capacity to insert and fetch data associated with a key. Keys are hashes, and so nodes can check that the document returned is correct by hashing it and checking the digest against the key.

Content Addressing and Discovery

Returning to the concept of addressing, distributed systems generally need a mechanism for discovery—that is, finding other nodes in the network based upon some criteria. A number of existing technologies present different methods of organizing clients so that they can be found without resorting to a single central directory. These include Chord, Hypercubes, and Kademlia (discussed previously).

4.1 Chord

FIG. 1 shows an exemplary 16-node chord network 100. In chord network 110, as nodes 105(1)-(16) come online they distinguish their position within the ring based on their identity. These nodes 105(1)-(16) identify themselves to the nodes immediately in front of and behind themselves, and become a part of the ring chain. For example, node 105(2) identifies itself to 105(3) ("successor") and nodes 105(1) ("predecessor")—the nodes immediately in front of and behind node 105(2) in a clockwise direction, respectively. As nodes 105(1)-(16) go offline, they try to notify their connections, but in the case of failure, their connections will notice the lack of connectivity and relink themselves.

Discovery requires messaging the closest node in the "finger list", for example, the successor, then messaging the closest node in their "finger list" and so on.

4.2 HyperCube

FIG. 2 shows an exemplary 2-level HyperCube 200. In level 2, each node not only has sibling nodes but also a parent node. For example, when node 205 comes online, it connects with three siblings and one parent: nodes 210, 215, 220 and 225. In HyperCube, as nodes come online, they simply take the next space in the tree structure. As nodes leave, vacancies are created that can be filled by future arriving nodes. In the dire case of too many nodes leaving, the existing nodes can reorganize.

Discovery is a fairly straight-forward navigation question once the effectively randomly assigned position identifier of a node are known.

4.3 Kademlia

In Kademlia, nodes are organized into "k-buckets" according to the binary digits of their identity. For example, the exemplary Kademlia network 300 includes 7 nodes 305(1)-(7), as shown by the dots at the bottom in FIG. 3. Assuming node 310(6) (with index "110") is the target node to be searched for, the remaining nodes 305(1-5) and 310(7) are peer nodes organized in 3 k-buckets 310(1)-(3), respectively, as shown by the larger circles. The "distance" as measured by the exclusive or (XOR) of two identities determines the relative closeness of another node, and a lopsided binary tree effectively means that references are maintained to more nodes closer to the target identity than those further away. For example, nodes 305(1)-(3) in k-bucket 310(1) are the farthest nodes away from target node 305(6), while node 305(7) in k-bucket 310(3) is the nearest node.

Discovery requires making a query to a node that is known about as close to the target identity as possible (based on the XOR "distance"). That node should theoretically have references to more nodes in that particular neighborhood and can get closer to the target identity. The discovery repeats until the contacted node returns identity of the target node (i.e., the target node is being found) or no more closer nodes are found.

As described above, values can be stored in a data structure using a hash table. The hash table associates keys to values. Given a key, the hash table computes a corresponding index according to a hash function that in turn points to the value stored in an array. Locating a value in a Kademlia network follows the same procedure by locating the closest nodes to a key or index, and the search terminates when a node has the requested value in its store and returns this value.

BRIEF DESCRIPTION OF THE DRAWINGS

Various embodiments of the disclosed concepts are illustrated by way of example and not by way of limitation in the accompanying drawings in which like references indicate similar elements. It should be noted that references to "some" embodiments in this disclosure mean at least one embodiment and they are not necessarily the same or different embodiments. To be concise, drawings may be used to facilitate descriptions of exemplary embodiments, and not all features of an actual implementation may be provided in the drawings.

DETAILED DESCRIPTION

Figure 1:
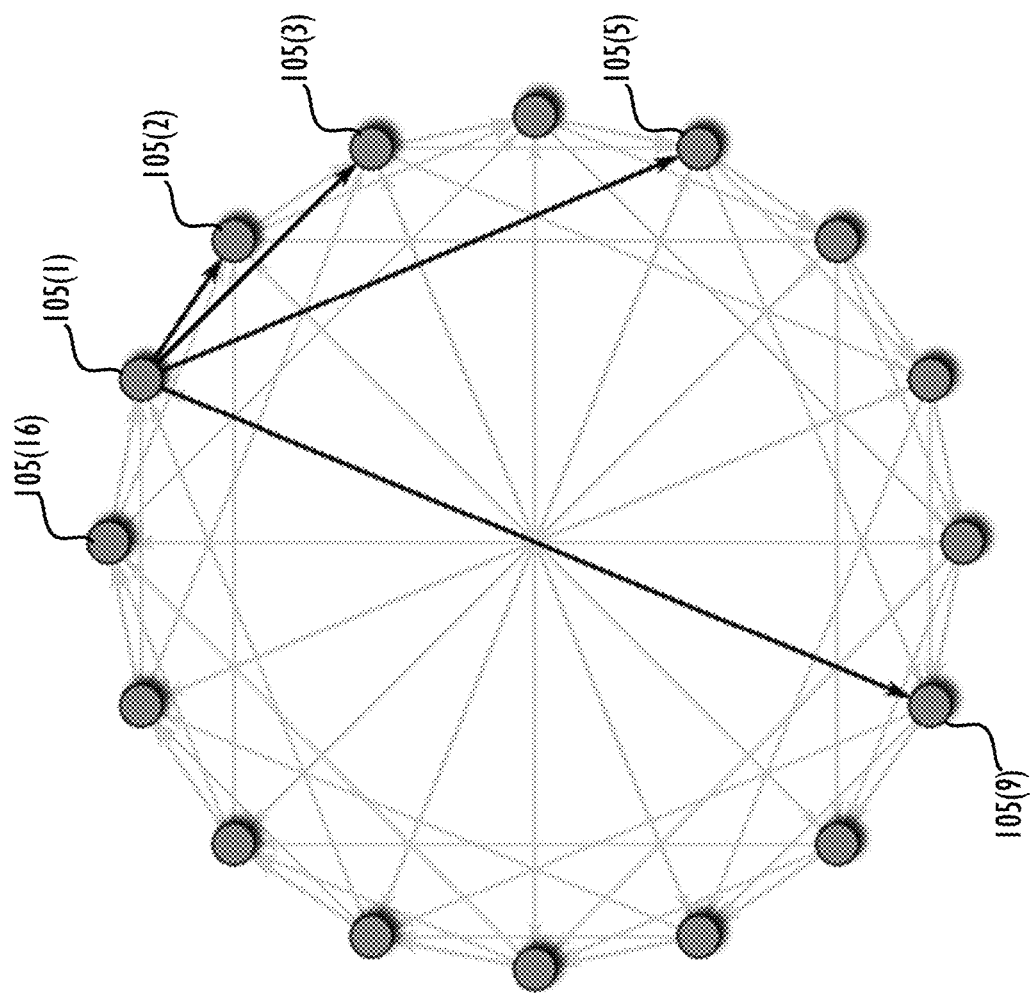
FIG. 1 shows an exemplary chord network.
Figure 2:
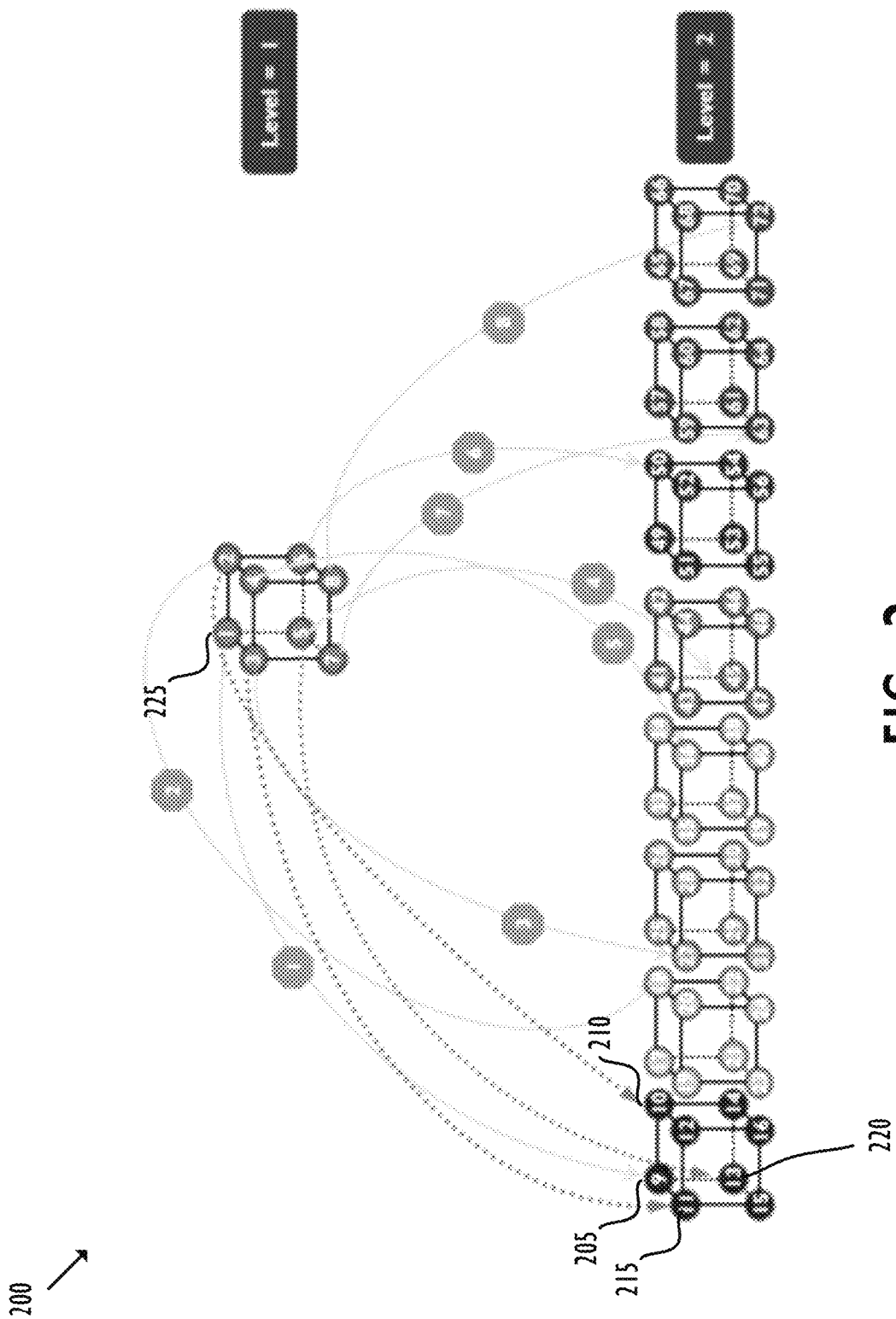
FIG. 2 shows an exemplary HyperCube.
Figure 3:
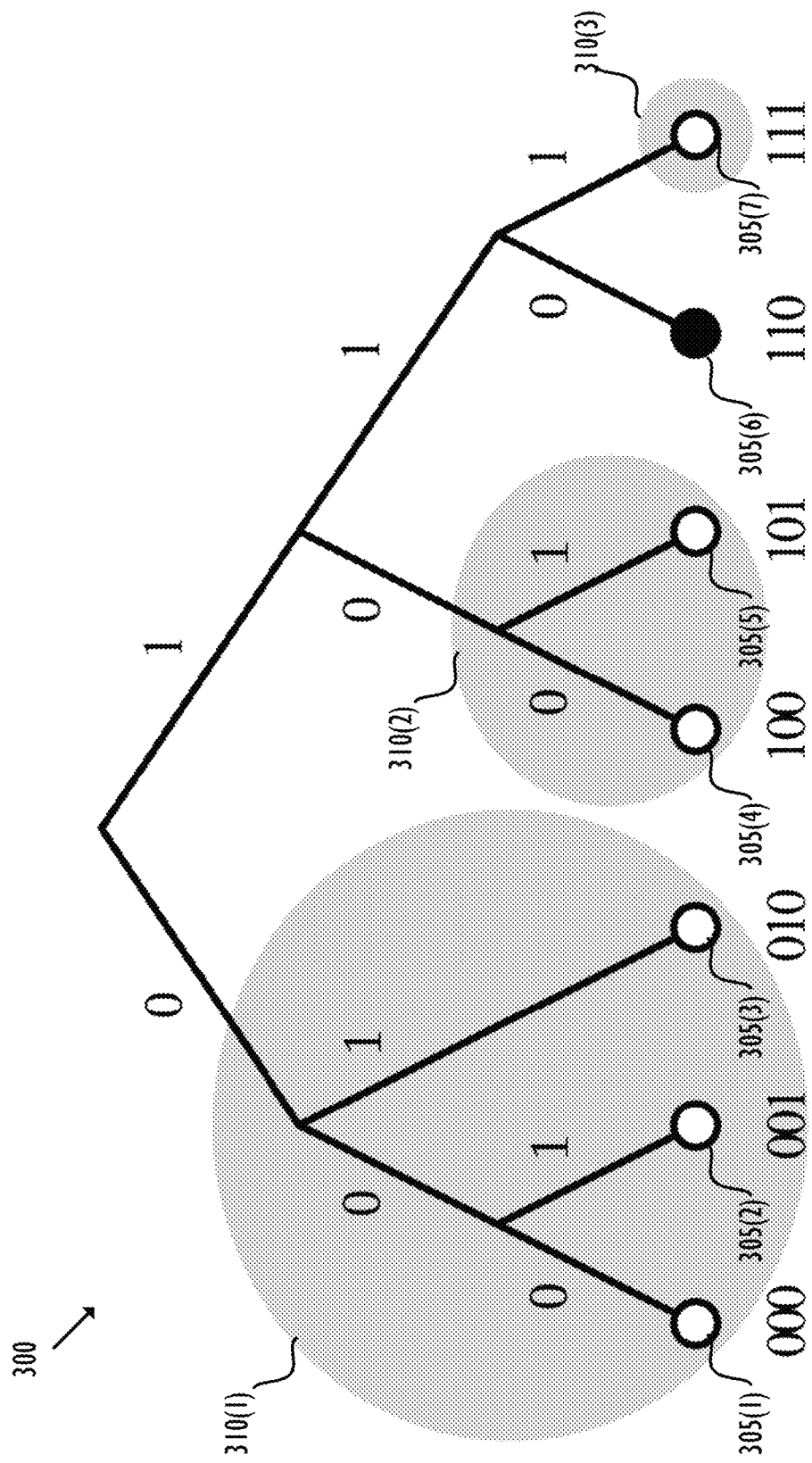
FIG. 3 shows an exemplary Kademlia network.
Figure 4:
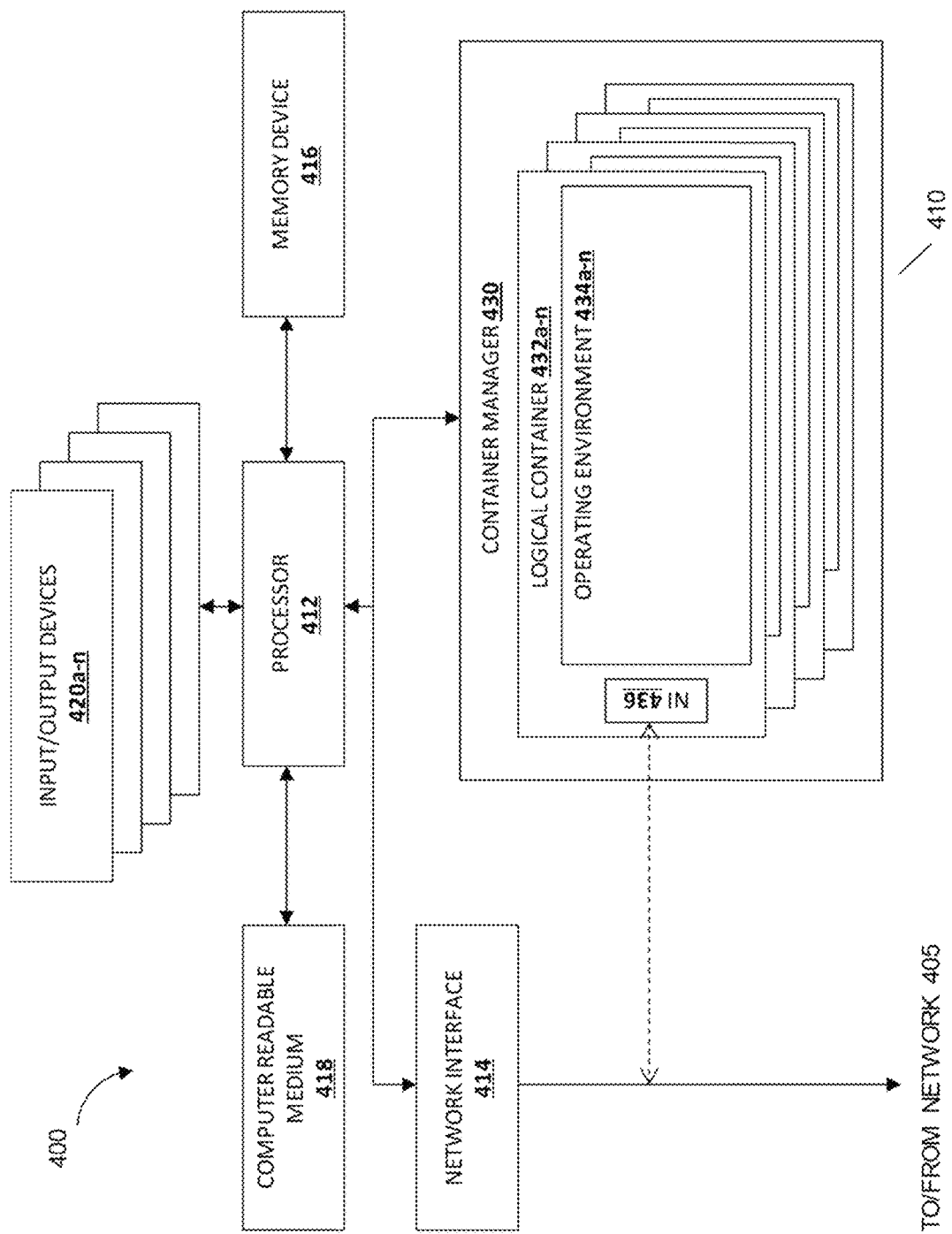
FIG. 4 shows an exemplary information processing system.

This disclosure describes a distributed system made up of a plurality of individual computing systems, each referred to as a "node." Referring now to FIG. 4, diagram 400 shows an information processing system 410 which may function as a node, coupled to a network 405. The network 405 could be any type of network, for example, wired network, wireless network, a private network, a public network, a local area network (LAN), a wide area network (WAN), a wide local area network (WLAN), a combination of the above, or the like. The network may also be a virtual network, such as an overlay or underlay network. In some embodiments, the network may operate on more than one level such that connections between nodes are virtually addressed or content addressed. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 410 shown is representative of, one of, or a portion of, the information processing systems described above.

The information processing system 410 may include any or all of the following: (a) a processor 412 for executing and otherwise processing instructions, (b) one or more network interfaces 414 (e.g., circuitry) for communicating between the processor 412 and other devices, those other devices possibly located across the network 405; (c) a memory device 416 (e.g., FLASH memory, a random access memory (RAM) device or a read-only memory (ROM) device for storing information (e.g., instructions executed by processor 412 and data operated upon by processor 412 in response to such instructions)). In some embodiments, the information processing system 410 may also include a separate computer-readable medium 418 operably coupled to the processor 412 for storing information and instructions as described further below.

In one embodiment, there is more than one network interface 414, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 410 may include a plurality of input/output devices 420a-n which are operably coupled to the processor 412, for inputting or outputting information, such as a display device 420a, a print device 420b, or other electronic circuitry 420c-n for performing other operations of the information processing system 410 known in the art.

With reference to the computer-readable media, including both memory device 416 and secondary computer-readable medium 418, the computer-readable media and the processor 412 are structurally and functionally interrelated with one another as described below in further detail, and information processing system of the illustrative embodiment is structurally and functionally interrelated with a respective computer-readable medium similar to the manner in which the processor 412 is structurally and functionally interrelated with the computer-readable media 416 and 418. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 400). Such interrelationships permit the data structures' functionality to be realized. For example, in one embodiment the processor 412 reads (e.g., accesses or copies) such functional descriptive material from the network interface 414, the computer-readable media 418 onto the memory device 416 of the information processing system 410, and the information processing system 410 (more particularly, the processor 412) performs its operations, as described elsewhere herein, in response to such material stored in the memory device of the information processing system 410. In addition to reading such functional descriptive material from the computer-readable medium 418, the processor 412 is capable of reading such functional descriptive material from (or through) the network 405. In one embodiment, the information processing system 410 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 410, without limiting them to a specific location or implementation.

The information processing system 410 may include a container manager 430. The container manager is a software or hardware construct that allows independent operating environments to coexist on a single platform. In one embodiment, the container manager is a hypervisor. In another embodiment, the container manager is a software isolation mechanism such as Linux cgroups, Solaris Zones, or similar. The container manager 430 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 418. The container manager may be included logically "below" a host operating system, as a host itself, as part of a larger host operating system, or as a program or process running "above" or "on top of" a host operating system. Examples of container managers include Xenserver, KVM, VMware, Microsoft's Hyper-V, and emulation programs such as QEMU, as well as software isolation mechanisms such as jails, Solaris zones, and Docker containers.

The container manager 430 includes the functionality to add, remove, and modify a number of logical containers 432a-n associated with the container manager. Zero, one, or many of the logical containers 432a-n contain associated operating environments 434a-n. The logical containers 432a-n can implement various interfaces depending upon the desired characteristics of the operating environment. In one embodiment, a logical container 432 implements a hardware-like interface, such that the associated operating environment 434 appears to be running on or within an information processing system such as the information processing system 410. For example, one embodiment of a logical container 434 could implement an interface resembling an x86, x86-64, ARM, or other computer instruction set with appropriate RAM, busses, disks, and network devices. A corresponding operating environment 434 for this embodiment could be an operating system such as Microsoft Windows, Linux, Linux-Android, or Mac OS X. In another embodiment, a logical container 432 implements an operating system-like interface, such that the associated operating environment 434 appears to be running on or within an operating system. For example one embodiment of this type of logical container 432 could appear to be a Microsoft Windows, Linux, or Mac OS X operating system. Another possible operating system includes an Android operating system, which includes significant runtime functionality on top of a lower-level kernel. A corresponding operating environment 434 could enforce separation between users and processes such that each process or group of processes appeared to have sole access to the resources of the operating system. In a third environment, a logical container 432 implements a software-defined interface, such a language runtime or logical process that the associated operating environment 434 can use to run and interact with its environment. For example one embodiment of this type of logical container 432 could appear to be a Java, Dalvik, Lua, Python, or other language virtual machine. A corresponding operating environment 434 would use the built-in threading, processing, and code loading capabilities to load and run code. Adding, removing, or modifying a logical container 432 may or may not also involve adding, removing, or modifying an associated operating environment 434.

In one or more embodiments, a logical container has one or more network interfaces 436. The network interfaces (NIs) 436 may be associated with a switch at either the container manager or container level. The NI 236 logically couples the operating environment 434 to the network, and allows the logical containers to send and receive network traffic. In one embodiment, the physical network interface card 414 is also coupled to one or more logical containers through a switch.

In one or more embodiments, each logical container includes identification data for use naming, interacting, or referring to the logical container. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

In a distributed system involving multiple nodes, each node will be an information processing system 410 as described above in FIG. 4. The information processing systems in the distributed system are connected via a communication medium, typically implemented using a known network protocol such as Ethernet, Fibre Channel, Infiniband, or IEEE 1394. The distributed system may also include one or more network routing element, implemented as hardware, as software running on hardware, or may be implemented completely as software. In one implementation, the network routing element is be implemented in a logical container 432 using an operating environment 434 as described above. In another embodiment, the network routing element is implemented so that the distributed system corresponds to a group of physically co-located information processing systems, such as in a rack, row, or group of physical machines.

The network routing element allows the information processing systems 410, the logical containers 432 and the operating environments 434 to be connected together in a network topology. The illustrated tree topology is only one possible topology; the information processing systems and operating environments can be logically arrayed in a ring, in a star, in a graph, or in multiple logical arrangements through the use of vLANs.

In one embodiment, one or more nodes acts as a controller to administer the distributed system. The controller is used to store or provide identifying information associated with the different addressable elements in the distributed system—specifically the cluster network router (addressable as the network routing element), each information processing system 410, and with each information processing system the associated logical containers 432 and operating environments 434.

In one embodiment, the distributed system including the components described above is organized as a Holochain network. A Holochain network is a distributed system with content-addressed nodes, where identities, nodes, and storage elements are all addressed by cryptographic hash values. Distributed applications run across multiple nodes in the network and the Holochain network is organized to provide a decentralized state coordination function so as to protect the integrity and functionality of the distributed, decentralized applications running on the network.

In a Holochain network, multiple individual hash chains are used to coordinate state between the various agents and the various nodes. Each hash chain is a ledger of records organized in "blocks." Each block in the hashchain may comprise a header and data (or "content") wherein the data may include information about a list of transactions, for example. Each block may be identified by a key such as a block hash, usually a unique number for each block generated using a cryptographic hashing algorithm on the header of the block. The header itself may have one or more fields storing metadata. The metadata may include, for example, the block hash of the previous block (or "parent block"), a root, and a timestamp. The block hash of the parent block (or "previous block hash") may again be generated using a cryptographic hashing algorithm on the header of the parent block. Because each block contains a previous block hash, the sequence of hashing linking each block to its parent block creates a chain going back all the way to the first block created (or "genesis block"). The root in the metadata of each block may provide a summary of the data in the block. In this fashion, a hash chain is conceptually similar to a Merkle tree, but one with a limited branching factor.

The above described layered relationships between header, root and data, and between child and parent blocks can ensure data integrity in a blockchain. For example, when the data of a block is modified in any way, including changes to the block metadata, the hash value of the block changes. Because each subsequent block in a hash chain recursively depends upon the values in previous blocks, any subsequent blocks must also have their hash values updated or the chain will be "forked," with new values based on the new block hash value. Thus, any change in any block, from the root up to any intermediate block, will immediately be apparent upon inspection.

A Holochain network is designed as a framework to tackle the above described challenges and provide data integrity for distributed, decentralized applications. A Holochain application (i.e., the application running on a Holochain platform or HApp) may comprise a network of nodes (or "agents"), each maintaining a unique source chain of its local data, paired with a shared space implemented as a validating, monotonic, sharded, distributed hash table (DHT), where every node enforces validation rule(s) on data in the shared DHT as well as confirms provenance of the data according to an associated signature. Unlike prior art hash chains, such as the blockchain associated with Bitcoin, which rely on global consensus around a single shared chain encoding the entire state of the system, a Holochain network includes a separate hash chain for each discrete HApp (including each version of each HApp). To coordinate state, individually interested nodes agree on a state modification function and the hashable result of the coordination of the two private shared states. The shared DHT space allows the coordinating nodes to deterministically identify other nodes that can record and verify the particulars of each state update. These "witness" nodes are spread psuedorandomly throughout the entire shared space, based upon a verifiable calculation distributing the witness nodes throughout the DHT using the hash of previous states as key inputs. Thus, only those who are interested in one particular set of transactions maintain the entire chain of state, but interactions with the states of other chains are coordinated and "witnessed" so that each chain of transactions can be validated back to the root, while still only requiring each participating node to share state with only a limited number of nodes. By analogy, a Holochain network can be analogized to real-world state updates, and an individual state update as a money transfer from A to B. Money can be transferred with validations from only A, B and a bank (as a "witness"). It does not require a consensus—a global agreement—from all the customers because they are not engaged in the transaction at all.

By eliminating the reliance on a global ledger, Holochain provides a truly decentralized application platform with actual self-governance and mutual sovereignty. On the other hand, by still using source chains to enforce data integrity, a Holochain may function very much like a blockchain without bottlenecks when it comes to enforcing a validation rule, but may be designed to be fully distributed through sharding so each node only needs to maintain one or more portions of the shared DHT instead of a full copy of a global ledger. This makes it feasible to run blockchain-like applications on devices as lightweight as portable devices, such as mobile phones.

Figure 5:
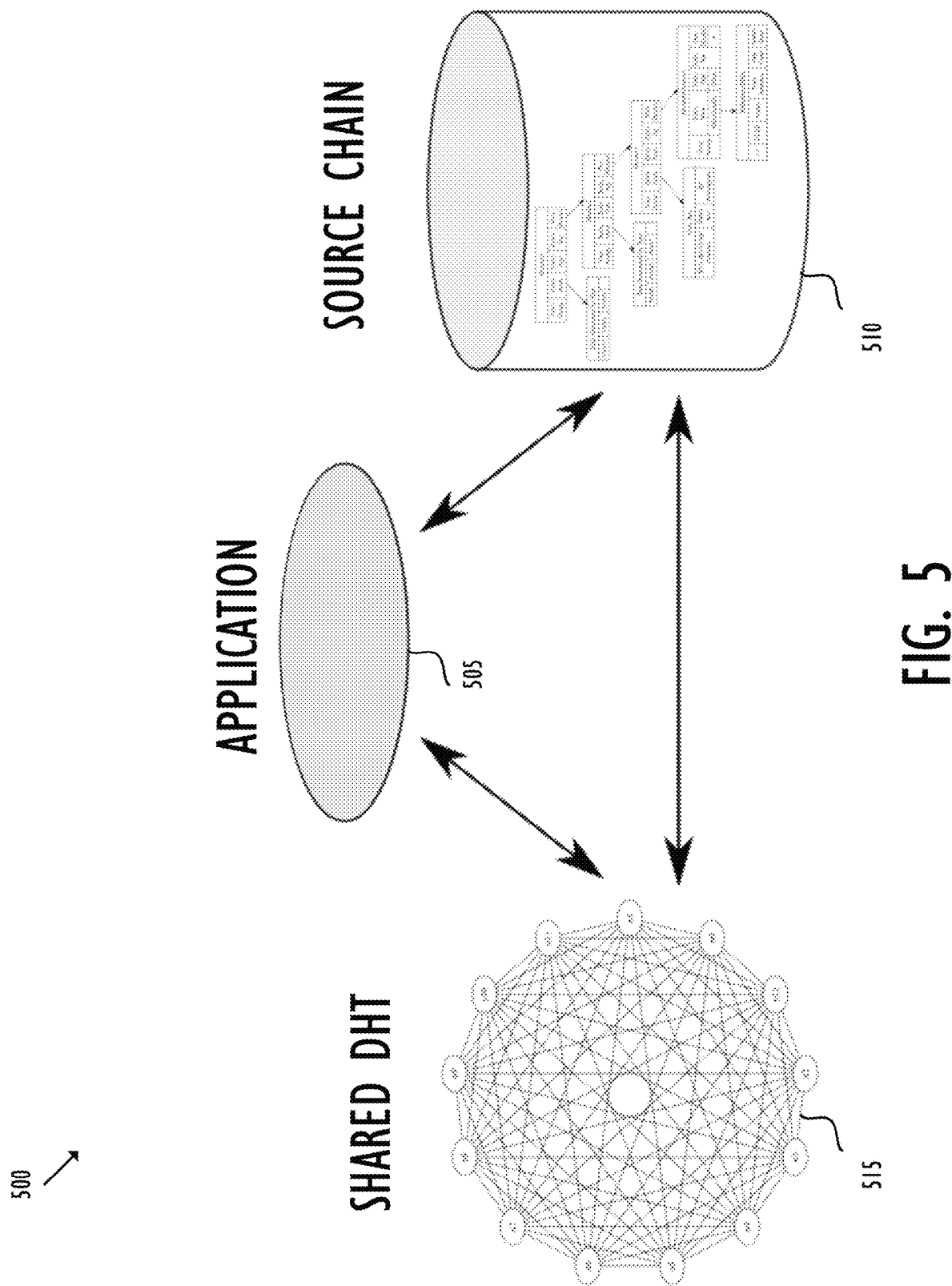
FIG. 5 shows the basic architecture of an exemplary holochain.

FIG. 5 shows a basic architecture of exemplary Holochain 500. Holochain 500 may include three main sub-systems—HApp 505, source chain 510, and shared DHT 515. HApp 505 coordinates the system to present consistent application functionality to a user or agent. HApp 505 may read and write local source chain 510, and it may also get data from and put authorized data onto shared DHT 515. HApp 505 includes validation rules for changing its local hash chain. Holochain 500 also includes other nodes connected to HApp 505 to provide independent system-level validation for changes proposed to be entered by HApp 505. HApp 505 may be a computer application running on Holochain 500. HApp 505 may be accessed, for instance, with a web browser for a user interface. Application 505 may be implemented using various programming tools, for instance, JavaScript, Lisp, Python or Go.

In Holochain 500, each node may have a local private space, like a local repository, for storing data (or "content"). For example, in collaborative software development, the data may be one or more coding files. Each node may be required to maintain an individual source chain 510. Source chain 510 may be achieved by a hash chain, like blockchain. For example, source chain 510 may comprise one or more blocks. Each block may be identified by a key, such as a block hash, usually a unique number for each block which may be created by hashing the header of the block. The header may include one or more fields storing metadata. The metadata may include, for instance, a previous block hash of the parent block, a root, and a timestamp. Like blockchain, the sequence of hashing between the child and parent creates a linked chain all the way back to the genesis block. In the example of collaborative software development, each block may be associated with one version of coding files. When HApp 505 carries out an action on the files, for instance, a file addition, deletion or change of content, a new version of the source chain is created. Accordingly, a new block may be provided including a new root which summarizes the action and new files. The action and new files may be validated based on a local validation rule before the new files are committed to the local repository and the new block is added to source chain 510. When the node shares the data, the node may publish a concomitant source chain 510 with a signature, which may be provided using a public-key encryption. Source chain 510 may be shared with a group of selected nodes selected using the shared DHT as described below. Each selected node may further add new block(s) to source chain 510 to capture their subsequent, respective actions on the same data. For example, node A may create software version 1.0 with a first block in source chain 510. The first block may summarize the data in version 1.0 with A's actions. Node A may add its signature, perform a validation, commit the software to A's local repository, and share the software with node B. Node B may next take the software, develop it to version 2.0, and update source chain 510 with a second block. The second block may summarize the data in version 2.0 with B's actions. Node B may then add its signature, complete the validation, commit the software to B's local repository, and pass the software onto a next node. The described operations may continue with the data sharing across Holochain 500. Along the process, source chain 510 may provide a verifiable tamper-proof track of data, while the signature may allow a verification of the data provenance.

Figure 6:
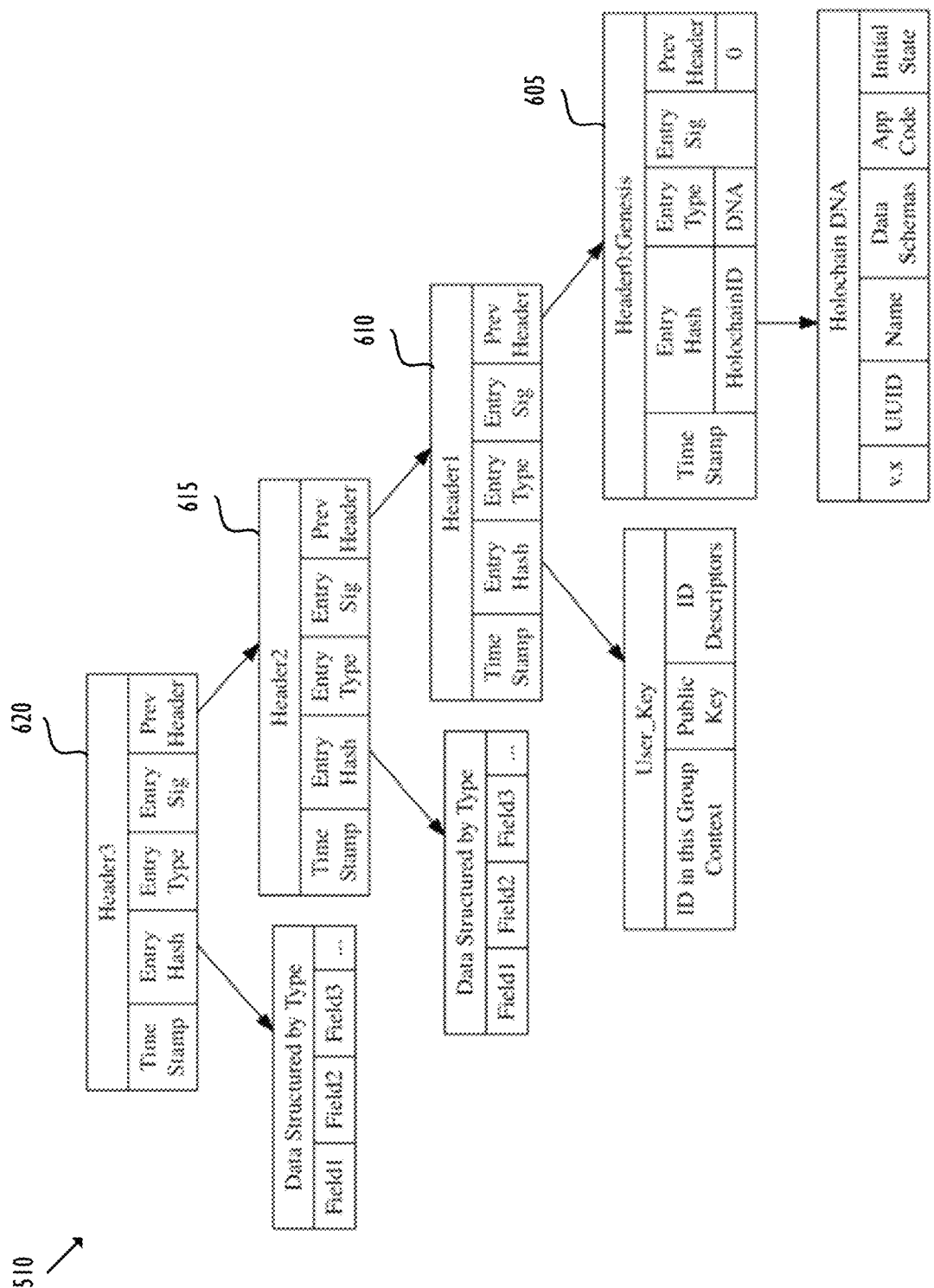
FIG. 6 shows the structure of an exemplary source chain.

FIG. 6 shows an exemplary structure of source chain 510. In FIG. 6, local source chain 510 may include blocks 605-620, wherein block 605 is the genesis block. Each block 605-620 may include a header and data (not shown in FIG. 6). As described, the header of each block 605-620 may include one or more fields with metadata. For example, block 605 may comprise header0, which may include one or more fields having metadata such as a timestamp (indicating the time when block 605 is created), an entry hash (e.g., the root), an entry type (e.g., addition, deletion or modification of the data), an entry signature (e.g., the signature of the node creating block 605), a previous header (e.g., the previous block hash), a Holochain ID, and the state modification rules applying to the HApp (the HApp "DNA"). Header0 may be hashed to create a block hash or an identifier of block 605.

Similarly, block 610 may also include a header and data (not shown in FIG. 6). The header of block 610 may further include metadata in one or more fields. The metadata of block 610 may comprise a timestamp, an entry hash, an entry type, an entry signature, and a previous header. In particular, the entry hash of block 610 may include a user key, which may be a hashed value of a data structure including ID in this group context, public key and ID descriptors. The foregoing process may repeat, for example, creating blocks 615 and 620, for each individual action and new data committed to the local repository.

Holochain is agent-centric because each node may share data with other nodes autonomously as wished without the need for a consensus from the entire system. To ensure data integrity, each entry may need to be first verified locally by the node—the source of data where it originates—and next validated at the system-level by a set number of other nodes identified through the shared DHT 515. The local validation may be used to ensure the structural validity of the local data. The local validation may be performed by each entity proposing a state update. In the case of a coordinated state update, like a transfer of information or credit from one HApp instance to another, all participating coordinating HApp instances all perform equivalent local validations using the state update functions described in the HApp "DNA" rules encoded into the application hash chain by HApp 505. Each entity should reach an identical new state, as validated by comparisons of the hashed values of the updated state and all previous hash chain state after applying the state update function. In addition, one or more nodes chosen from the DHT also follow the same update rule and store the result. After the local validation, node A may add its signature, and publish the new entry to shared DHT 515 by sharing the data and concomitant source chain 510 with other nodes.

Shared DHT 515 is a monotonic ledger because any entry added may no longer be deleted. Instead, it may only be tagged with a "deleted" marker, which does not actually delete the entry but rather only allows it to be ignored. Shared DHT 515 may further be considered to reside at a "public space" because it is not located at the private space of one specific node. Instead, shared DHT 515 may comprise all of the published source chains (as a monotonic ledger) and be held collectively by all of the nodes on Holochain 500. Unlike blockchain, each node may need to carry only one or more portions (or shards) of shared DTH 515 instead of a full copy of the entire ledger. In contrast to prior art blockchain systems, no node and no agent needs to hold all or even most of the ledger. In this distributed manner, each node may be responsible to maintain its own data and concomitant source chain 510 and be ready to provide them to other nodes for confirmation, when asked. In addition, all nodes may be responsible to share one or more portions of one or more other nodes' source chains. For example, source chain 510 created by node A may be distributed to one group of selected nodes on Holochain 500. Each selected node may retain a local copy of source chain 510. The selected nodes may be identified according to one or more selection parameters. For example, the nodes may be chosen according to their respective "distances" from node A. The distances may be defined as the number of hop(s) in routing a message from node A to a given node, for example. Further, the nodes may be named based on their uptime such that the total sum of uptime of all of the selected nodes may exceed a resilience factor, which is determined based on reliability and availability requirements of Holochain 500 or HApp 505. Note that this manner of selection may result in the Holochain network adapting to changes in topology and a shared DHT redistribution by regulating the number of network-wide redundant copies of shared source chains.

When node A pushes new entry to shared DHT 515, a subset from the group of selected nodes may be picked as validators to perform the system-level validation of the new entry. The subset of nodes may be chosen randomly to represent unbiased witnesses. With a successful validation, the new entry may be accepted and allowed to propagate. Otherwise, it may be rejected, and the node initiating the invalid entry may be held accountable for the fraud. The validation rule may be defined specifically for each HApp 505. The validation rule may include, for instance, business rules, application logic, restrictions, etc., which may have different demands for strictness of different applications. Further, the validation may change dynamically in response to the configuration or variation of the applications. Each selected node may verify the entry shared by node A based on node A's source chain 510, confirm the source of data based on A's signature, and validate the entry with the system-level validation rule. When a selected node completes all the checks successfully, it may mark the received data valid and then add its own signature. The selected node may further share the entry, like an initiating node.

Holochain 500 may further provide a mechanism for nodes to share information regarding those who have broken validation rule(s). The bad-acting nodes may be punished, for example, by being excluded from participation in HApp 505. In particular, nodes may use "gossip" to share information about their experience of the behavior of other nodes. According to a gossip protocol, each node may maintain a set of metrics about another node, including a metric "experience" and a metric "confidence" of that experience. The set of metrics may be established through direct experiences with a given node or based on gossips from other nodes. The set of metrics may be stored at each node's own private space, and shared with other nodes directly as needed. In addition, each node may keep a signed declaration (or "warranty") as for any of the set of metrics, such as the metric experience or metric confidence. The warranty may be maintained in a manner similar to that of source chain 510. For example, when a node introduces a new metric or alerts an existing metric, its action(s) on the metric may be footprinted in the warranty. The warranty may function as a tool for other nodes to make provenance-based verifiable claims about a given node in the network. Those claims may be gossiped from one node to another which need to hear about the claims so as to make decisions about interacting with the given node. A node may determine the node to be gossiped with based on a measurement, for instance, a probabilistic value weighing that information from the given node may change the set of metrics of the node to be gossiped with. A node may further use its set of metric to determine a node to be gossiped about. In particular, the metric confidence may impact the selection of nodes to be gossiped with or about. A node with high confidence may be one that has first-hand experience with a given node's actions. This node may be allowed to gossip about the given node more proactively, for example, by "pushing" a gossip about the given node to other nodes. Conversely, a node with low confidence may be only allowed to gossip passively through "pulling"—pulling information by other nodes from this node. There may be various reasons why a node has low confidence about a given node. For example, the node may have a unique relationship with a given node to be gossiped about, for instance, the node relies on the given node to route message. This unique relationship may negatively affect the node's confidence with the given node or discourage the node from gossip about the given node.

Figure 7:
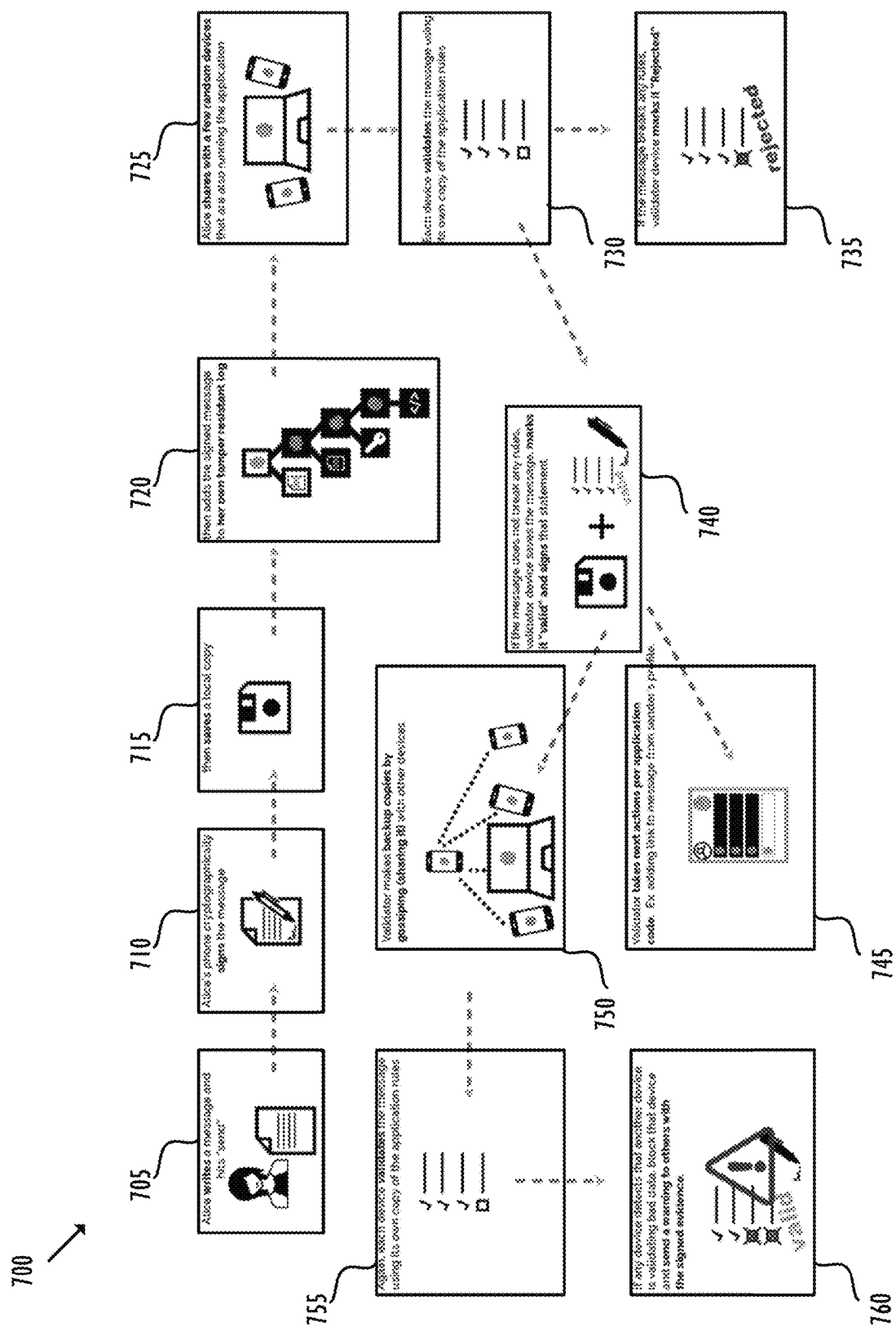
FIG. 7 shows the operation of an exemplary holochain application.

FIG. 7 shows the operation of an exemplary Holochain application. In FIG. 7, a participant or node of HApp 505—Alice—may write a message (i.e., data) for sharing with other nodes of HApp 505 (block 705). Alice may cryptographically sign the message with a public-key encryption (block 710). The message, with Alice's signature, may be saved (or committed) locally at Alice's private space (block 715). The data, such as the message, plus Alice's signature, may be reserved into Alice's source chain 510 after local validation (block 720). The message, with concomitant source chain 510, may be shared by Alice with a subset of selected nodes (block 725). As described, the nodes may be selected as validators according to one or more parameters, for instance, their respective distances from Alice, their uptime, and a resilience factor. In addition, the validators may be chosen randomly to represent unbiased witnesses. Each validator may check the validity of the shared message (block 730). For example, each validator may retain a local copy of Alice's published source chain 510 and use it to validate the history of the message (e.g., the content of the message and editing by Alice). In addition, each validator may confirm the provenance of the message (e.g., the message is initiated by Alice) according to Alice's signature. Finally, each validator may validate that the message meets the system-level validation rule as defined by HApp 505. If any of the checks fails, the validator may reject the message and mark it "rejected" (block 735). Conversely, if the message passes the validation, a validator may accept the message, mark it "valid" and add its own signature (block 740). The validator may take further actions as needed by HApp 505, for example, adding a link to the message from Alice's profile (block 745). In addition, the validator may gossip its experience about Alice A with other nodes (block 750). As described, the gossip may involve the communication of a set of metrics. Each node being gossiped with may serve as a new validator to continuously verify messages (block 755), in the way as described above. Note that once a validator adds its own signature, this validator may be held accountable as well for an invalid message. If the message breaches a validation rule(s), the message may be marked "rejected" and the node(s) sharing the message may be held liable (block 760). For example, nodes may gossip a warning about a bad-acting node, and the bad-acting node may further be excluded from participation in HApp 505.

In the Holochain network described above, each node is in communication with a subset of the other nodes in the network, but as the number of nodes increases, it becomes impractical for each node to be connected with all or even a substantial portion of the available nodes. The Holochain network may use a relaxed, agent-centric distributed hash table (RRDHT) structure to organize the nodes as well as perform discovery for a requested value. According to some embodiments, each node in the Holochain network may self-elect its own agent location, store radius and query radius. A node requesting a value may first examine the availability of the requested value in its store radius based on its agent location, and then expend the inquiry into the query radius, and so on. According to some embodiments, a node may go through a bootstrapping phase for joining a new Holochain network. The joining node may publish its agent location, store radius and query radius until after it has expand to a threshold number of nodes within the radius that the joining node attempts to store or query. The threshold number may be associated with a resilience factor. According to some embodiments, the nodes in the Holochain network may push data to a storing node or pull data from another node through gossiping.

In the following description, for purposes of explanation, numerous specific details are set forth to provide a thorough understanding of the disclosed concepts. As part of this description, some of this disclosure's drawings represent structures and devices in block diagram form to avoid obscuring the disclosure. In the interest of clarity, not all features of an actual implementation are described in this disclosure. Moreover, the language used in this disclosure has been principally selected for readability and instructional purposes and has not necessarily been selected to delineate or circumscribe the full inventive scope of the disclosed subject matter, which is defined by the appended claims.

Agent Identity, Agent Location, Store Radius and Query Radius

Relaxed, agent-centric distributed hash table (RRDHT) aims at providing quick peer discovery during content addressing in a Holochain network. In RRDHT, nodes may self-elect and publish separate "store radius" and "query radius" values based on an "agent loc" or "agent location" of the node. The agent locations may represent the individual locations of the nodes in the Holochain network—the Holochain network may discover the nodes based on their agent locations. The agent loc may be any kind of objects, such as a number, a string, a symbol, etc. According to some embodiments, the agent loc may be determined based on an identity of the node ("agent identity"). For example, the identity of the node may be associated with a public key, for instance a binary number, in a cryptographic, digital signature of the human user associated with the node. Alternatively, the identity of the node may be an object associated with the content stored by the node. The term "content" may represent any type of objects, such as a number, a data, a symbol, a value, a piece of code, a documentation, and so on. Furthermore, the identity of the node may be a hash, for example, the hash of the public key, to provide further security. The agent loc of a node may be determined based on the agent identity of the node. For example, the agent loc may be an unsigned integer number wrapped to a fixed range, for instance, between 0 and 4,294,967,295 (or FFFFFFFF in hexadecimal). As shown by the Python code below, given that the agent identity of a node is a 32-byte hash, for example, the agent loc of the node may be derived by compressing the binary agent identity into a 4-byte number by applying an XOR operation to every successive four bytes of the agent identity.

let hash=b"fake hash fake hash fake hash . . . ";
let mut loc: [u8; 4]=[0; 4];
loc.clone_from_slice(&hash[0 . . . 4]);
for i in (4 . . . 32).step_by(4) {
   loc[0]^=hash[i];
   loc[1]^=hash[i+1];
   loc[2]^=hash[i+2];
   loc[3]^=hash[i+3];
}

Discovery in Holochain Network according to RRDHT

Figure 8:
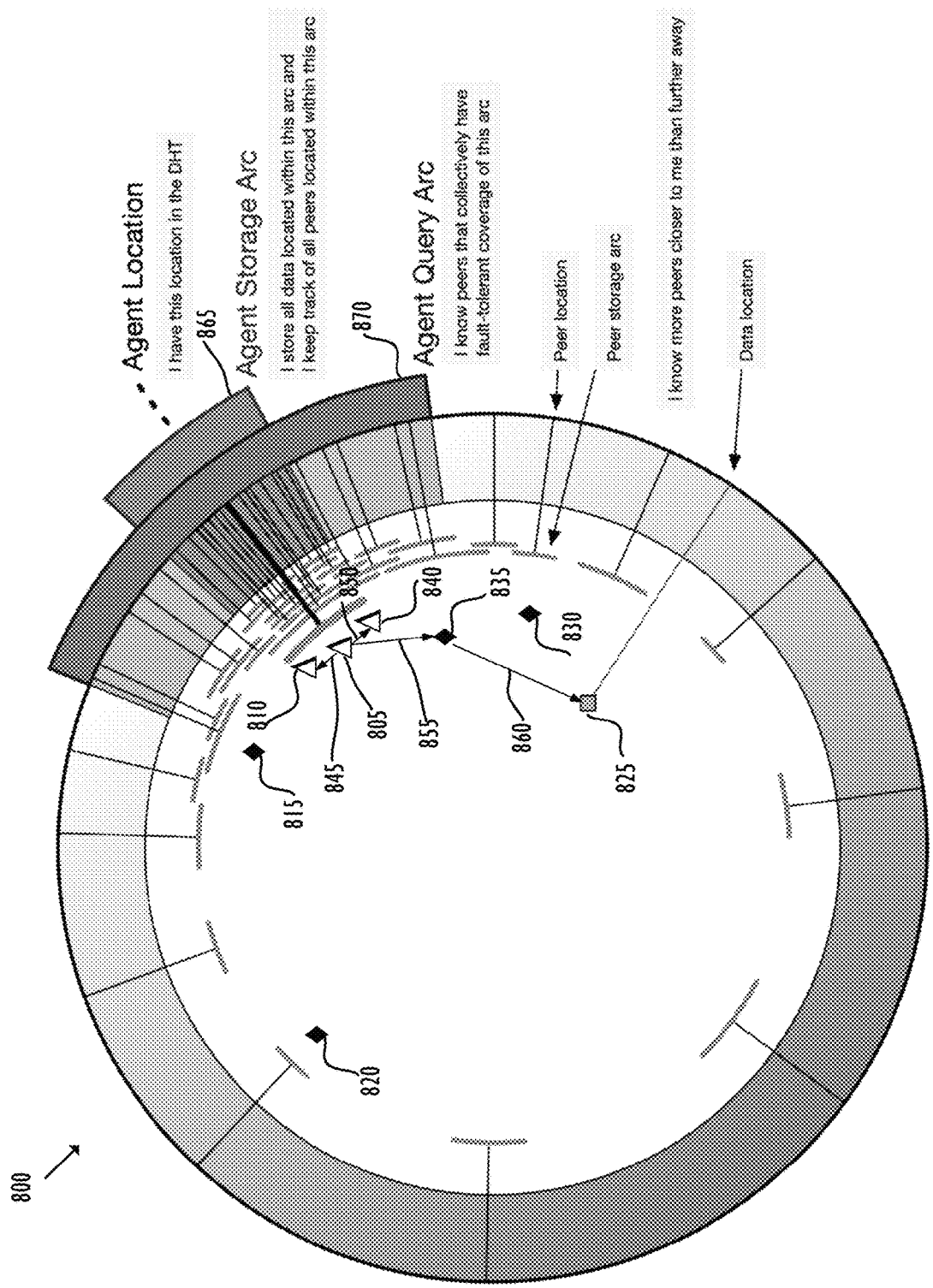
FIG. 8 shows an exemplary Holochain network according to some embodiments.

Given a requested value, one primary goal of RRDHT is for a random node to be able to find the appropriate node that stores and accordingly retrieve the requested value. This discovery process can be explained with reference to FIG. 8. For ease of illustration, only 8 nodes (805, 810, 815, 820, 825, 830, 835 and 840) are depicted in exemplary Holochain network 800. In this specific example, because the agent locations of the nodes are defined as integers wrapped to a fixed range, Holochain network 800 may be represented by a ring. Moreover, nodes 805, 810, 815, 820, 825, 830, 835 and 840 may reside along the ring with even or unequal distances from each other as shown in FIG. 8.

Node 805 ("requesting node") may request a value which is stored at node 825 ("target node"). Initially, node 805 may not know that node 825 stores the requested value, nor does node 805 may know the address of node 825. In a further extreme scenario, node 805 may never establish a prior connection with node 825—node 805 may not know node 825 exists in Holochain network 800 at all. The term "connection" may indicate a networking communication in any type of manner, for example, through a land telephone network, a wired network, a wireless network, a mobile network, a satellite network, or a combination of the above, etc.

The discovery of node 825 by node 805 may be performed based on the store radius and query radius of node 805 as well as the agent locations of the nodes in Holochain network 800. The store radius may correspond to a bucket of peer nodes, within agent storage arc 865, whose storage content the requesting node may have knowledge about. According to some embodiments, it may be preferential to place the bucket of peer nodes close to the requesting node thus reducing the hops in discovery. This may associate the store radius with the agent locations of the nodes in the Holochain network. For example, if the agent loc of a node is 42, a store radius of 2 may indicate a bucket of peer nodes with agent locations in the range of 40-44. Accordingly, a store radius of zero may represent the node itself. Referring to FIG. 8, a store radius of 1 of node 805 may indicate a bucket of peer nodes, such as node 810 and 840, which may reside within the distance of the store radius surrounding the requesting node. Moreover, node 805 may have knowledge about the storage content of nodes 810 and 840 within the store radius.

Node 805 may also have a query radius. The query radius may indicate a bucket of nodes ("a bucket of references"), within agent storage arc 870, with which the requesting node may have connections—the addresses of the bucket of nodes in the query radius have been known to the requesting node. Therefore, the query radius of a node may always be equal to, or greater than, the store radius of the node. Referring to FIG. 8, the query radius of node 805 may produce two references (besides nodes 810 and 840 in the store radius)—nodes 815 and 835—whose addresses may have been known to node 805. Unlike nodes 810 and 840 in the store radius, node 805 may not have information about the content stored by nodes 815 and 835. Instead, node 805 may merely know the existence of nodes 815 and 835 exist in Holochain network 800 and have their addresses. The term "address" may refer to any type of addresses according to a networking protocol, for example, point-to-point protocol (PPP), user datagram protocol (UDP), transmission control protocol/Internet protocol (TCP/IP), etc.

Node 805 may perform the discovery as the following to retrieve the requested value from node 825. First, node 805 may examine, as shown by arrows 845 and 850, whether the requested value is available in its store radius—whether the requested value is stored at nodes 810 or 840—because node 805 may already have knowledge about the storage content of nodes 810 and 840. The examination of nodes 810 and 840 may be carried out in order or in parallel. If the requested value is available in the store radius, the storing node may return the requested value, and the discovery may terminate.

Conversely, if the requested value is not available in the store radius, node 805 may further the discovery to the bucket of nodes in the query radius, such as nodes 815 and 835. Because node 805 maintains the addresses indexing of nodes 815 and 835, node 805 may be able to communicate with nodes 805 and 835 and inquire whether they include the requested value. According to some embodiments, node 805 may inquire the node in the query radius which has a closest distance to the target node 825. The distance may be measured according to the agent locations of the nodes, which, in turn, may be associated with the storage content of each individual nodes, as described above. This way, RRDHT may associate the requested value with agent locations in a manner analogous to the relationship between a value/key pair in a hash table. In FIG. 8, node 805 may have two nodes 815 and 835, in the query radius. Between these two references, node 835 may have a closest distance to target node 825. Thus, node 805 may inquire node 835, as shown by arrow 855, about the availability of the requested value. If node 835 stores the requested value, node 835 may return the requested value, and the discovery may terminate.

Conversely, if the requested value is not available in the query radius, the foregoing discovery may be repeated around a new center at node 835. For example, node 835 may also have a store radius and a query radius. The store radius may indicate a bucket of nodes whose storage content node 835 may have knowledge about, while the query radius may correspond to a bucket of nodes with which node 835 may have connections. Node 835 may continue the discovery by first examining its store radius and then expand to the query radius, and so on. In this specific example in FIG. 8, target node 825 may reside within the store radius of node 835. Thus, in response to the examination of node 835, as shown by arrow 860, node 825 may return the requested value to node 835 which may further forward the requested value to node 805, and the discovery may end.

Figure 9:
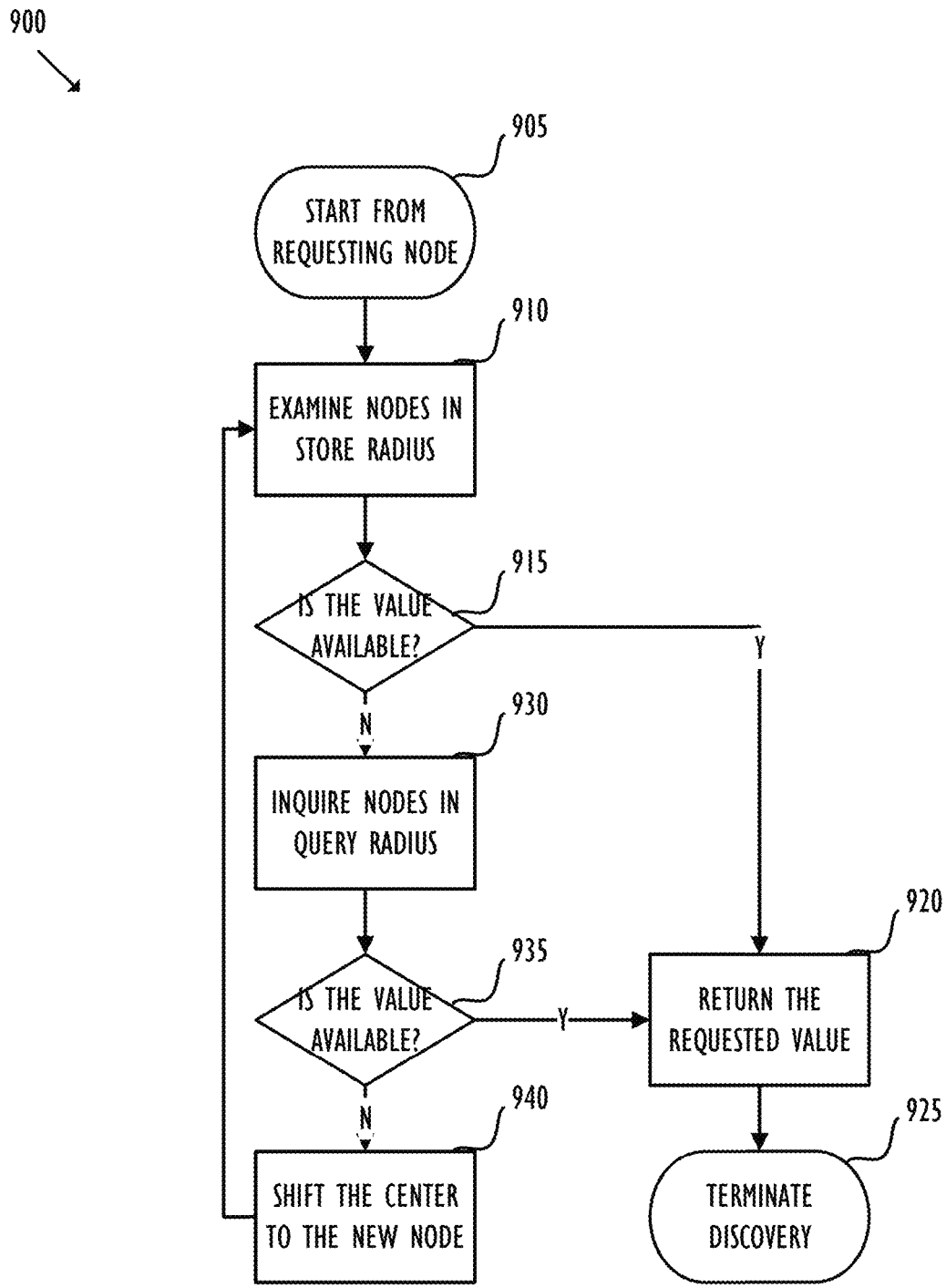
FIG. 9 shows an exemplary discovery process in a Holochain network according to some embodiments.

FIG. 9 illustrate an exemplary discovery process 900 in a Holochain network. The requesting node may start from a requesting node looking for a requested value (block 905). The requesting node may first examine whether the requested value is stored by any of peer nodes in the store radius based on the agent loc of the requesting node (blocks 910 and 915). If the requested value is available in the store radius, the storing node may return the requested value to the requesting node (block 920), and the requesting node may terminate the discovery (block 925). Conversely, if the requested value is not available, the requesting node may expand its search to the peer nodes in the query radius (block 930). The requesting node may inquire whether the requested value is stored by any of the peer nodes in the query radius (block 935). According to some embodiments, the requesting node may inquire the node ("inquired node") in the query radius that has a closest distance to the target node. The distance may be measured based on the agent locations of the nodes. If the requested value is stored in the query radius, the storing node may return the requested value (block 920) and the discovery may end (block 925). Conversely, if the requested value is not available in the query radius, the discovery may shift the center to the inquired node (block 940). The inquired node may continue the discovery by repeating the foregoing searching process.

According to some embodiments, requesting node 805 may choose to keep references to a certain number of additional nodes outside the query radius, for example, node 410 in FIG. 4. When a node discovers such a reference, it will decide whether the node should be kept in favor of existing references. For example, the node may give a preference to closer nodes. This algorithm gives preference to closer nodes, and could be something like the following:

Given the loc space remaining outside the query radius
Call a 34% sized zone exactly in the center zone "X3"
Call two adjacent 22% sized zones "X2A" and "X2B"
Call the remaining two 11% sized zones "X1A" and "X1B"

Nodes will track up to 2 peers in each zone. If they already have two peers, a quality algorithm will decide which to keep based on responsiveness, size of store, query radii, and other metrics. Imagine a worst-case scenario: a DHT network with 4 billion nodes. The network stores so much data that all nodes choose to only index a radius of 1 and keep a query radius of 2. A worst-case query should be O(log n)/roughly 22 hops.

But individual node references do not take up that much memory space, so nodes could, in fact, store a great deal more references than the above algorithm, and publish a much wider query radius than 2. These factors greatly reduce the number of hops to query. In most real-world applications, it should be trivial to achieve full query radius coverage, thus reducing the hops for any query to 1.

Bootstrapping

A node that would like to join a Holochain network may first go through a bootstrap process. During bootstrapping, the joining node may need to know the address of at least another node—a bootstrap node—that is already participating in the Holochain network. Upon joining the Holochain network, the joining node may reset its address indexing, store radius and query radius to zero. The joining node may not self-elect any radii without first knowing that it may see a threshold number of nodes within the radius that the joining node attempts to store or query. According to some embodiments, the threshold may be associated with a resilience factor ("R") which represent a level of availability in case one or more of the nodes within the radius become offline. For example, if the resilience factor is 25, the joining node may not publish either a store or query radius greater than zero until after the joining node has expended enough such that there are 25 peer nodes reside within the radius that the joining node attempts to publish.

Publishing Date and Gossip

Push

In a Holochain network, publishing data may require a node ("publishing node") communicating with a peer node which claims responsibility for storing that data. The publishing node may then push that data to the storing node in an exponential manner, for example, using a protocol with low overhead such as UDP. The publishing node may already know what peer nodes should be storing the data because those peer nodes are in the bucket within its store radius. According to some embodiments, depending on the networking protocol of the Holochain network, it may be preferred to publish the data to more than one peer nodes to achieve better reliability and availability. Further, the publishing node may re-publish the data periodically or when the date receives a new update.

Pull

After a node is initially synchronizing to the network to achieve a store radius, the node may need to continuously maintain consistency afterwards. The node may gossip with other peer nodes which overlap, at least partially, the same store radius. The nodes may compare the storage content with and pull data from, as needed, each other to remain the synchronization and data consistency.

The various embodiments described above are provided by way of illustration only and should not be constructed to limit the scope of the disclosure. Various modifications and changes can be made to the principles and embodiments herein without departing from the scope of the disclosure and without departing from the scope of the claims.

What is claimed is:
1. A system for coordinating distributed computation, the system comprising:
a plurality of nodes, each node including a processing element, a network interface, and a memory, the plurality of nodes communicatively coupled together via a network;

a keyspace defined across the plurality of nodes, the keyspace having a simple closed shape with a number of dimensions;

wherein each node of the plurality of nodes has a location in the keyspace as defined by a hash function mapping inputs to points in the keyspace, and a location in the network;

wherein a first node has a first store radius, the first store radius describing a closed shape in the keyspace associated with the location of the node in the keyspace, the first store radius having one fewer dimension than the number of dimensions in the keyspace, and wherein the memory in the first node stores information at memory locations associated with keyspace locations within the first store radius;

wherein first node has a first query radius, the first query radius describing a closed shape in the keyspace associated with the location of the node in the keyspace, the first query radius having one fewer dimensions than the number of dimensions in the keyspace, wherein the first query radius is larger than the first store radius;

wherein a first subset of the nodes from the plurality of nodes have keyspace locations within the first query radius, and the first node stores the network location of the first subset of the nodes, each of the nodes in the first subset of the nodes having a secondary store radius and a secondary query radius;

wherein the processing element of each node is operable to respond to a request for information stored at an arbitrary location in the keyspace by:

when the requested information has a keyspace location within the store radius, returning the value of the information from the first node;

when the requested information has a keyspace location outside the store radius but inside the query radius, querying, via the network, a second node from the first subset of the nodes within the query radius and returning the value of the information returned from the second node with a secondary store radius encompassing the requested keyspace location; and returning a network location referral to a third node, wherein the keyspace location of the third node has a lower distance from the keyspace location of the requested information than the keyspace location of the first node.

2. The system of claim 1 wherein the processing element of each node is operable to respond to the request for information by one of responding with information retrieved from an associated memory location in a node; responding with the output of a calculation; and responding with the output of a calculation, wherein one of the inputs to the calculation was retrieved from a memory location in a node.

3. The system of claim 2 wherein the keyspace forms a two-dimensional circle.

4. The system of claim 2 wherein the keyspace is non-Euclidean.

5. The system of claim 2 wherein the location of the first node in the keyspace is inside the store radius of the first node.

6. The system of claim 2 wherein the location of the first node in the keyspace is inside the query radius of the first node.

7. The system of claim 2 wherein the first node further stores the network location of a second subset of the nodes, wherein each of the nodes in the second subset of the nodes has a keyspace location outside the first query radius, and each of the nodes in the second subset having a tertiary store radius and a tertiary query radius.

8. The system of claim 7 wherein none of the tertiary query radii overlap with the first query radius.

9. The system of claim 7 wherein the maximum number of nodes in the second subset of the nodes is capped.

10. A method for coordinating distributed computation, the method comprising:

communicatively coupling a plurality of nodes via a network, each node including a processing element, a network interface, a network location, and a memory;

defining a keyspace across the plurality of nodes, the keyspace having a simple closed shape with a number of dimensions;

assigning each node of the plurality of nodes a keyspace location, a store radius, and a query radius;

each keyspace location being defined by a hash function mapping inputs to points in the keyspace;

each store radius describing a closed shape in the keyspace having one fewer dimension than the number of dimensions in the keyspace;

each query radius describing a closed shape in the keyspace having one fewer dimension than the number of dimensions in the keyspace, where the query radius is greater than the store radius;

receiving a request at a first node, the request being associated with a keyspace location;

when the requested information has a keyspace location within the store radius of the first node, responding from the first node;

when the requested information has a keyspace location outside the store radius of the first node but inside the query radius of the first node, querying, via the network, a second node from the first subset of the nodes within the query radius and returning the response received from the second node; and returning a network location referral to a third node, wherein the distance from the keyspace location of the third node to the keyspace location associated with the request is less than the distance from the keyspace location of the first node to the keyspace location associated with the request.

11. The method of claim 10 wherein returning a response includes one of responding with information retrieved from a memory location associated with a node; responding with the output of a calculation; and responding with the output of a calculation, wherein one of the inputs to the calculation was retrieved from a memory location in a node.

12. The method of claim 11 wherein the keyspace location of each node is contained within the store radius of the same node.

13. The method of claim 11 wherein the store radius of each node is located within the query radius of the same node.

14. The method of claim 11 wherein the keyspace forms a two-dimensional circle.

15. The method of claim 11 wherein the keyspace is non-Euclidean.

16. The method of claim 11 wherein the third node has a keyspace location outside the query radius of the first node.

17. A node in a distributed processing system, the node comprising:

a processing element, a network interface, a network location, a first keyspace location, and a memory, wherein the processing element is operable to:

compute a requested location within a multidimensional keyspace corresponding to a distributed hash table;

store and retrieve information corresponding to a first closed area within the keyspace in the memory;

store and retrieve information corresponding to a second closed area within the keyspace in the memory;

receive a request via the network interface, the request being associated with a keyspace location;

when the request keyspace location is within the first closed area within the keyspace, responding to the request using the information retrieved from the memory corresponding to the request keyspace location;

when the request keyspace location is within the second closed area within the keyspace, forwarding the request to a network location retrieved from the memory corresponding to the request keyspace location; and returning a network location referral, wherein the network location referral target is closer to the request keyspace location than first keyspace location.

18. The node of claim 17 wherein responding to the request using the information retrieved from the memory corresponding to the request keyspace location includes one of responding with information retrieved from the memory; responding with the output of a calculation; and responding with the output of a calculation, wherein one of the inputs to the calculation was retrieved from the memory.

19. The node of claim 18 wherein the keyspace location of the node is contained within the first closed area within the keyspace.

20. The node of claim 19 wherein the first closed area within the keyspace is contained within the second closed area within the keyspace.

* * * * *